May 1, 1934.    J. DANTSCHER    1,957,249
ELECTRON DISCHARGE APPARATUS
Filed Oct. 6, 1932
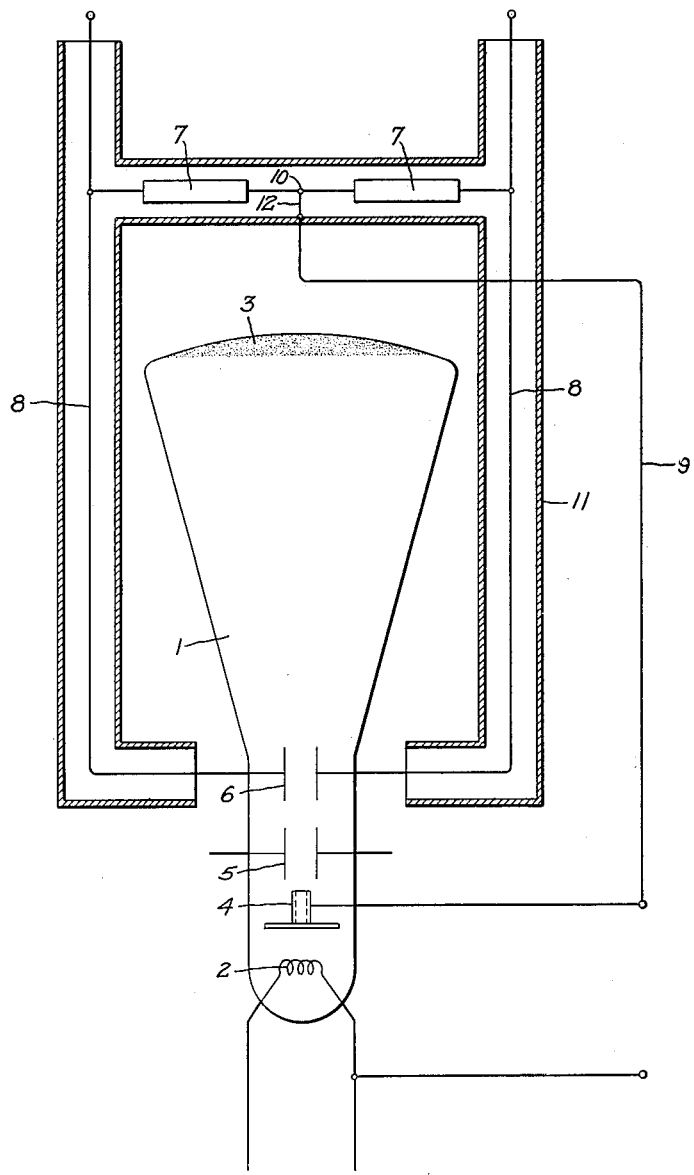
Inventor:
Josef Dantscher,
by Charles E. Tuller
His Attorney.

Patented May 1, 1934

1,957,249

UNITED STATES PATENT OFFICE 1,957,249

ELECTRON DISCHARGE APPARATUS

Josef Dantscher, Berlin-Reinickendorf-Ost, Germany, assignor to General Electric Company, a corporation of New York Application October 6, 1932, Serial No. 636,552
In Germany October 3, 1931

2 Claims. (Cl. 250—27.5)

The present invention relates to electron discharge apparatus, more particularly to cathode-ray tubes or oscillographs for measuring voltage and current changes in an electric supply source.

In tubes of this sort which involve deflection of the cathode-ray in accordance with the voltage or current changes of the measuring circuit, there is often considerable distortion of the image on the fluorescent screen caused by the effect of the measuring potential on the sweep circuit which determines the time characteristic. Moreover, in the prior art arrangements in which the anode of the electron gun is connected to one of the measuring plates, the cathode-ray spot does not coincide with the center of the screen when the measuring potential is zero but is located to one side thereof. This effect also tends to introduce error into the determinations or measurements.

Objects of the present invention are to improve the structure and operation of cathode-ray oscillographs with a view toward reducing the image distortion introduced by the factors mentioned. The invention in brief, consists in insulating from a capacity standpoint the measuring circuit from the sweep circuit and in addition, connecting the anode to a mid-tap on a bridge circuit which energizes the measuring deflection plates. The invention will be better understood when reference is made to the following specification and accompanying drawing which shows in diagrammatic form, a tube and circuit arrangement improved in accordance with the present invention.

In the drawing, numeral 1 designates the envelope of a cathode-ray tube containing at one end a filamentary cathode 2 and at the other end, a coating 3 of well-known material on the interior surface which fluoresces when activated by impinging electrons. Within the tube, there are also the usual anode 4 of the electron gun, the sweep-wave or timing plates 5 which serve to deflect the electrons across the tube and the plates 6 to which the voltage or current to be measured is applied.

In accordance with my invention, a pair of equal impedances 7, resistances (potentiometer), inductances or the like are connected across the conductors 8 joined to the respective deflecting plates at one end and to the measuring circuit (not shown) at the other end. The impedances of the shunt circuit should be as high as possible consistent with the required intensity of the electron flow in the tube. A connection 9 may be taken from the electrical center 10 of the shunt circuit to the anode 4. If desired, the impedances may be replaced by a transformer of suitable voltage ratio, for example 1:1, the secondaries of which are connected in the shunt circuit and the primaries to the measuring circuit. Since the secondaries are electrically separate from the primary windings, one end of the latter may be grounded to give stability to the circuit as a whole.

In accordance with another feature of my invention, the conductors 8, also the impedances, are contained within small metal cylinders 11 which are electrically connected by a conductor 12 to the mid-point of the shunt circuit. The cylinders 11 may extend as close as possible to the deflecting plates, also to the measuring circuit so as completely to shield the conductors contained therein. The capacitance of the cylindrical condensers 11 should be made as small as possible by properly dimensioning their diameter and length.

It has been found that when the connections are made in the manner stated, and the cylinders 11 provided, the center of the cathode-ray stream impinges on the center of the fluorescent screen when the measuring potential is zero. Consequently, when alternating potential is applied to the measuring plates, the cathode-ray stream moves symmetrically with respect to the zero axis and therefore causes a symmetrical deflection with respect to the fluorescent screen. It will also be noted that on account of the bridge circuit arrangement, the capacitance effect of the screening cylinders 11 becomes a minimum since these cylinders are charged during each alternation to only one-half of the alternating potential. Thus, there are no stray capacities about the tube 1 or about the conductors leading thereto.

What I claim as new and desire to secure by Letters Patent of the United States, is:

1. A cathode ray tube including a source of electrons, an anode, a screen adapted to fluoresce when activated by impinging electrons, electron deflecting members adapted to be connected to a measuring circuit, an impedance shunted across said deflecting members, and a conducting connection between the electrical center of said impedance and said anode.

2. A cathode-ray tube including a source of electrons, an anode, a screen adapted to fluoresce when activated by impinging electrons, electron-deflecting members adapted to be connected to a measuring circuit, an impedance conductively connected across said deflecting members, a connection between the electrical center of the impedance and said anode, metal members surrounding the conductors between said measuring circuit, deflecting members and impedance and connected to the said electrical center of the impedance whereby the circuit is shielded from capacity effects and the center of the cathode-ray stream strikes the center of the screen when the potential of the measuring circuit is substantially zero.

JOSEF DANTSCHER.

DISCLAIMER 1,957,249.—*Josef Dantscher*, Berlin-Reinickendorf-Ost, Germany. ELECTRON DISCHARGE APPARATUS. Patent dated May 1, 1934. Disclaimer filed November 7, 1936, by the assignee, *General Electric Company*.

Hereby enters this disclaimer to claim 1.

[*Official Gazette December 1, 1936.*]